United States Patent [19]

Maekawa et al.

[11] 4,338,427
[45] Jul. 6, 1982

[54] PROCESS FOR PRODUCING POLYIMIDE-AMIDE-CARBOXYLIC ACID

[75] Inventors: Iwao Maekawa; Daisuke Makino, both of Hitachi, Japan

[73] Assignee: Hitachi Chemical Company Ltd., Tokyo, Japan

[21] Appl. No.: 138,976

[22] Filed: Apr. 10, 1980

[30] Foreign Application Priority Data

Apr. 10, 1979 [JP] Japan .................................. 54-43827

[51] Int. Cl.³ ....................... C08G 18/32; C08G 18/30
[52] U.S. Cl. ................................. 528/53; 528/48; 528/49; 528/51; 528/52; 528/73
[58] Field of Search ....................... 528/73, 49, 51, 52, 528/53, 48

[56] References Cited

U.S. PATENT DOCUMENTS

| | | | |
|---|---|---|---|
| 3,716,519 | 2/1973 | Yoda et al. | 528/73 |
| 3,817,926 | 6/1974 | Pauze et al. | 528/73 |
| 3,959,233 | 5/1976 | Hanson et al. | 528/73 |
| 4,026,833 | 5/1977 | D'Alelio | 528/73 |
| 4,160,753 | 7/1979 | Lorenz et al. | 528/73 |

Primary Examiner—H. S. Cockeram
Attorney, Agent, or Firm—Craig and Antonelli

[57] ABSTRACT

Polyimide-amide-carboxylic acids produced by reacting an aromatic diamine with an aromatic tetracarboxylic acid dianhydride in amounts of 1.5 to 2.0 moles of the latter per mole of the former in the presence of an inert solvent, and reacting the resulting intermediate reaction product with an aromatic diisocyanate in about equivalent amounts at a temperature of 50° to 100° C. while removing generated carbon dioxide from the reaction system are good in heat resistance, wear resistance, chemical resistance, etc.

10 Claims, 2 Drawing Figures

PROCESS FOR PRODUCING POLYIMIDE-AMIDE-CARBOXYLIC ACID

BACKGROUND OF THE INVENTION

This invention relates to a process for producing a polyimide-amide-carboxylic acid, more particularly to a process for producing a polyimide-amide-carboxylic acid containing imide rings, amide linkages and carboxylic acid moieties in the polymer chain.

There are known the following references in this art; i.e. Japan JAP. PAT No. 676-7/67 (Derwent Jap. Pat. Report) (1967), J. Applied Polymer Science vol. 19, 2961–2980 (1975) and J. Polymer Science 7, 2757–2762 (1969).

The polyimide-amide-carboxylic acids obtained by this invention are good in heat resistance, wear resistance, chemical resistance, etc., and are useful for preparing electrical insulating materials, various molding materials, films, adhesives, paints and varnishes, and the like.

SUMMARY OF THE INVENTION

This invention provides a process for producing a polyimide-amide-carboxylic acid which comprises (a) reacting an aromatic diamine with an aromatic tetracarboxylic acid dianhydride in amounts of 1.5 to 2.0 moles of the latter per mole of the former in the presence of an inert solvent, and (b) reacting the resulting reaction product with an aromatic diisocyanate in about equivalent amounts at a temperature of 50° to 100° C. while removing generated carbon dioxide from the reaction system.

DESCRIPTION OF THE PREFERRED EMBODIMENTS

Figure 2:
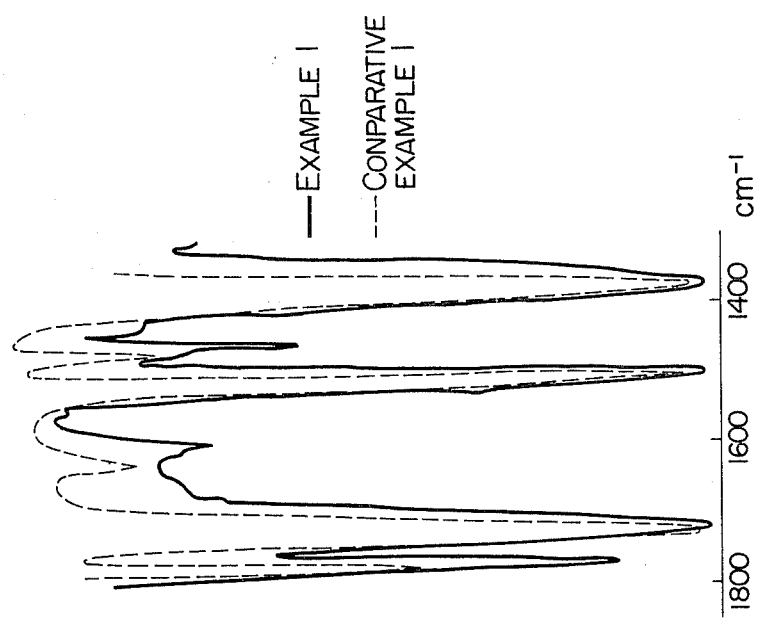
FIG. 2 shows infrared spectra of polyimide-amide-carboxylic acid (Example 1) and a conventional polyamide-carboxylic acid (Comparative Example 1) after dehydration and heat treatment for ring closure.

When 1 mole of an aromatic diamine is reacted with 1.5 to 2.0 moles of an aromatic tetracarboxylic acid dianhydride in the presence of an inert solvent, a reaction product having the following formula seems to be produced:

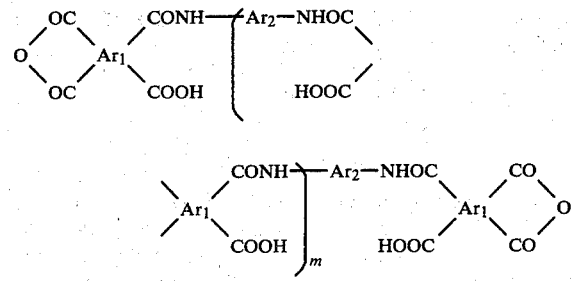

wherein $Ar_1$ is an aromatic residue; $Ar_2$ is an aromatic residue containing or not containing $-SO_2NH_2$ or $-CONH_2$; and m is zero or 1.

When this reaction product (intermediate product) is reacted with an aromatic diisocyanate in an almost equivalent amount with respect to the acid anhydride group of the reaction product at a temperature of 50° C. to 100° C. while removing generated carbon dioxide from the reaction system, the desired polyimide-amide-carboxylic acid can be obtained.

According to this invention, a prepolymer of amide-carboxylic acid having acid anhydride groups at the both ends of the molecule is produced first, and subsequently a polyimide-amide-carboxylic acid can be obtained by elongating the chain of the prepolymer by imide formation reaction of the acid anhydride group and the diisocyanate group as shown in the following formulae:

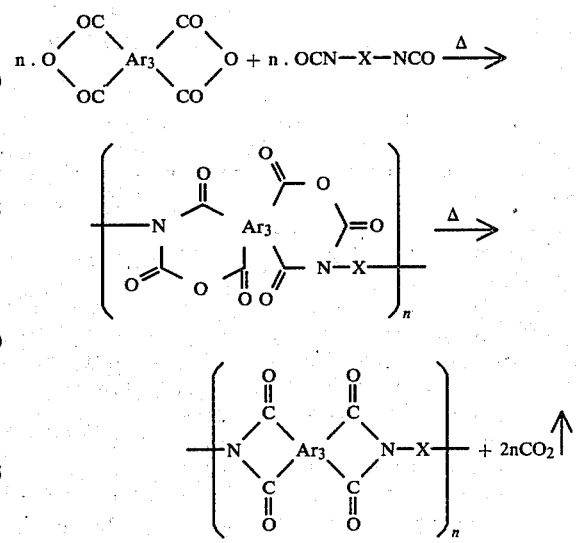

wherein $Ar_3$ is an amide-carboxylic acid residue; X is an isocyanate residue; and n is an integer of 10 to 20.

According to this invention, there are many advantages comparing with a conventional process for producing polyamide-carboxylic acids in that an amide-carboxylic acid concentration contained in the polymer chain is low, change of the viscosity is little, storage stability is good, and time required for dehydration of the intermdiate and heat treatment for ring closure (imide formation) can be shortened, and the like.

As the aromatic diamines, there can be used 4,4'-diaminodiphenyl ether, 4,4'-diaminodiphenylmethane, 4,4'-diaminodiphenyl sulfide, meta-phenylenediamine, para-phenylenediamine, 1,5-naphthalenediamine, 2,6-naphthalenediamine, and the like. Further, aromatic diamines containing $-SO_2NH_2$ group or $-CONH_2$ group such as 4,4'-diaminodiphenyl ether-3-sulfonamide, 4,4'-diaminodiphenyl ether-3-carbonamide, etc. can be used. These aromatic diamines can be used alone or as a mixture of two or more of them.

As the aromatic tetracarboxylic acid dianhydrides, there can be used pyromellitic acid dianhydride, 3,3',4,4'-diphenyltetracarboxylic acid dianhydride, 3,3',4,4'-benzophenonetetracarboxylic acid dianhydride, 1,2,5,6-naphthalenetetracarboxylic acid dianhydride, 2,3,5,6-naphthalenetetracarboxylic acid dianhydride, 2,3,5,6-pyridinetetracarboxylic acid dianhydride, 1,4,5,8-naphthalenetetracarboxylic acid dianhydride, and the like. These aromatic tetracarboxylic acid dianhydrides can be used alone or as a mixture of two or more of them.

In the reaction between the aromatic diamine and the aromatic tetracarboxylic acid dianhydride in the presence of an inert solvent, 1.5 to 2.0 moles of the aromatic tetracarboxylic acid dianhydride is used per mole of the aromatic diamine. If the amount of the aromatic tetracarboxylic acid dianhydride is less than 1.5 moles, the carboxylic acid concentration contained in the molecule cannot be lowered, while if the amount is more than 2.0 moles, unreacted aromatic tetracarboxylic acid dianhydride is retained.

The inert solvent is not always required to dissolve all the monomeric compounds. Examples of the inert organic solvents are N-methyl-2-pyrrolidone, N,N-dimethylacetamide, N,N-dimethylformamide, N,N-diethylformamide, dimethylsulfoxide, hexamethylphosphoramide, tetramethylene sulfone, cresol, and the like. These solvents can be used alone or as a mixture of two or more of them.

The reaction between the aromatic diamine and the aromatic tetracarboxylic acid dianhydride can be carried out, for example, by dissolving the aromatic diamine in an inert solvent as much as possible, adding the aromatic tetracarboxylic acid dianhydride to the inert solvent and maintaining the temperature at 80° C. or lower, more preferably about room temperature or lower with stirring. But there is no limitation to the adding method regarding the aromatic diamine, the aromatic tetracarboxylic acid dianhydride and the inert solvent. The reaction can proceed rapidly and the viscosity of the reaction system increases.

The reaction is continued until a constant acid value is obtained. Higher acid values are obtained at the initial period of the reaction. The acid value is determined by adding 2 ml of a mixture of water and pyridine (water/pyridine=10/2 in weight ratio) to about 0.1 g of a sample (the reaction solution) and maintaining the resulting mixture at 60° C. for 1 hour with stirring and heating, followed by the method according to JIS K 6911.

The thus obtained reaction product (intermediate) is reacted with an aromatic diisocyanate in almost equivalent amounts (in the preferable range of equivalent ratio of 0.95 to 1.05 of the latter to 1.00 of the former).

Examples of the aromatic diisocyanates are 3,3'-diphenylether diisocyanate, 3,3'-diphenylmethane diisocyanate, 2,4-tolylene diisocyanate, 2,6-tolylene diisocyanate, and the like. These aromatic diisocyanates can be used alone or as a mixture of two or more of them.

In the reaction between the intermediate and the aromatic diisocyanate, if the temperature is lower than 50° C., it is difficult to proceed the reaction, while if the temperature is higher than 100° C., there takes place reaction between the carboxylic acid and the isocyanate other than the imide formation reaction between the acid anhydride group and the isocyanate to produce urea linkages, which results in easily bringing about gelation. Therefore the imide formation reaction should be carried out at a temperature of 50° C. to 100° C., and in order to carry out the imide formation reaction more selectively it is preferable to carry out the reaction at a temperature of 60° to 90° C. by using an imide formation catalyst such as a tertiary amine, e.g. benzyldimethylamine, triethanolamine, triethylamine, trimethylamine, pyridine, N-methylpyrrolidone, etc.

This invention is illustrated by way of the following examples but is not limited to them.

In the following examples, the term "inherent viscosity" is defined by the following equation:

$$\eta_{inh} = \frac{\ln (t/t_o)}{C}$$

wherein ln means natural logarithm; t is the efflux time for the polymer solution; $t_o$ is the efflux time for the solvent; and C is a concentration of the polymer in the polymer solution and expressed as grams of the polymer in 100 ml of the polymer solution. The viscosity is measured in N-methylpyrrolidone in the concentration (C) of 0.5 g/100 ml at 30° C.

Pyrolysis initiation temperature is a temperature at which weight loss begins to take place when measured in the air according to thermogravimetric analysis (TGA) at a temperature rise of 10° C./min.

Tensile strength and elongation are measured according to JIS C2318.

EXAMPLE 1

In a 500-ml four-necked flask equipped with a thermometer, a calcium chloride tube, a stirrer, and a nitrogen introducing pipe, 20 g (0.1 mole) of 4,4'-diaminodiphenyl ether and 300 g of N-methylpyrrolidone were placed and stirred for 15 minutes. To this, 32.7 g (0.15 mole) of pyromellitic acid dianhydride was added gradually and the reaction was carried out at 20° C. for 2 hours to give a compound having an acid value (ring open acid value) of 428. To this, 12.5 g (0.05 mole) of 3,3'-diphenylmethane diisocyanate, said amount being an equivalent amount regarding the acid anhydride group, was added and the temperature was raised to 75° C. The reaction was carried out for 2 hours by adding 0.1 g of benzyldimethylamine while removing carbon dioxide generated out of the reaction system. After the completion of the reaction, a portion of the reaction solution was taken out and dropped into water to produce a precipitate, which was dried under reduced pressure at 40° C. for 14 hours. Inherent viscosity of the resulting compound was 0.64 dl/g.

Subsequently, the reaction solution mentioned above was coated on a glass plate in 10 mils thick and dried at 100° C. for 1 hour. After peeling off from the glass plate, the film was heat treated at 250° C. for 30 minutes to give a film having imide rings. Infrared spectrum of the film after dried at 100° C. for 1 hour was shown in FIG. 1 and that of the film after treated at 250° C. for 30 minutes was shown in FIG. 2. In the drawings, the absorption at 1780 cm$^{-1}$ is due to the imide group. The resin obtained in Example 1 had imide linkages; this is quite contrary to a conventional amide-carboxylic acid resin.

The film obtained after the heat treatment of the resin had the following properties:
Tensile strength (25° C.): 9.8 kg/mm$^2$
Elongation (25° C.): 10.9%
Pyrolysis initiation temperature: 439° C.

EXAMPLE 2

In the same apparatus as used in Example 1, 350 g of N-methylpyrrolidone was placed, followed by the addition of 9.72 g (0.04 mole) of 4,4'-diaminodiphenyl ether-3-carbonamide and 12.0 g (0.06 mole) of 4,4'-diaminodiphenyl ether. After stirring for 15 minutes, 25.76 g (0.08 mole) of 3,3',4,4'-benzophenonetetracarboxylic acid dianhydride and 26.16 g (0.12 mole) of pyromellitic acid dianhydride were gradually added to the resulting mixture and the reaction was carried out at room temperature (18° C.) for 25 hours to give a compound having a ring open acid value of 457. To this, 25.2 g (0.1 mole) of 3,3'-diphenylether diisocyanate, said amount being an equivalent amount regarding the acid anhydride group, was added and the temperature was raised to 80° C. The reaction was carried out for 3 hours by adding 0.05 g of benzyldimethylamine while removing carbon dioxide generated out of the reaction system. After the completion of the reaction, inherent viscosity of the reaction product measured in the same manner as described in Example 1 was 0.73 dl/g. Then, the reaction solution was coated on a glass plate in 10 mils thick and dried at 100° C. for 1 hour. After peeling off from the glass plate, the film was heat treated at 300° C. for 30 minutes to give a tough imide film.

The film had the following properties:
Tensile strength (25° C.): 13.6 kg/mm$^2$
Elongation (25° C.): 11.6%
Pyrolysis initiation temperature: 464° C.

COMPARATIVE EXAMPLE 1

In the same apparatus as used in Example 1, 350 g of N-methylpyrrolidone was placed and 24.0 g (0.12 mole) of 4,4'-diaminodiphenyl ether was added and dissolved in N-methylpyrrolidone. To this, 26.16 g (0.12 mole) of pyromellitic acid dianhydride was added gradually and the reaction was carried out in a constant temperature bath at 15° C. for 8 hours to give a viscous reaction solution. Inherent viscosity measured in the same manner as described in Example 1 was 0.82 dl/l.

Figure 1:
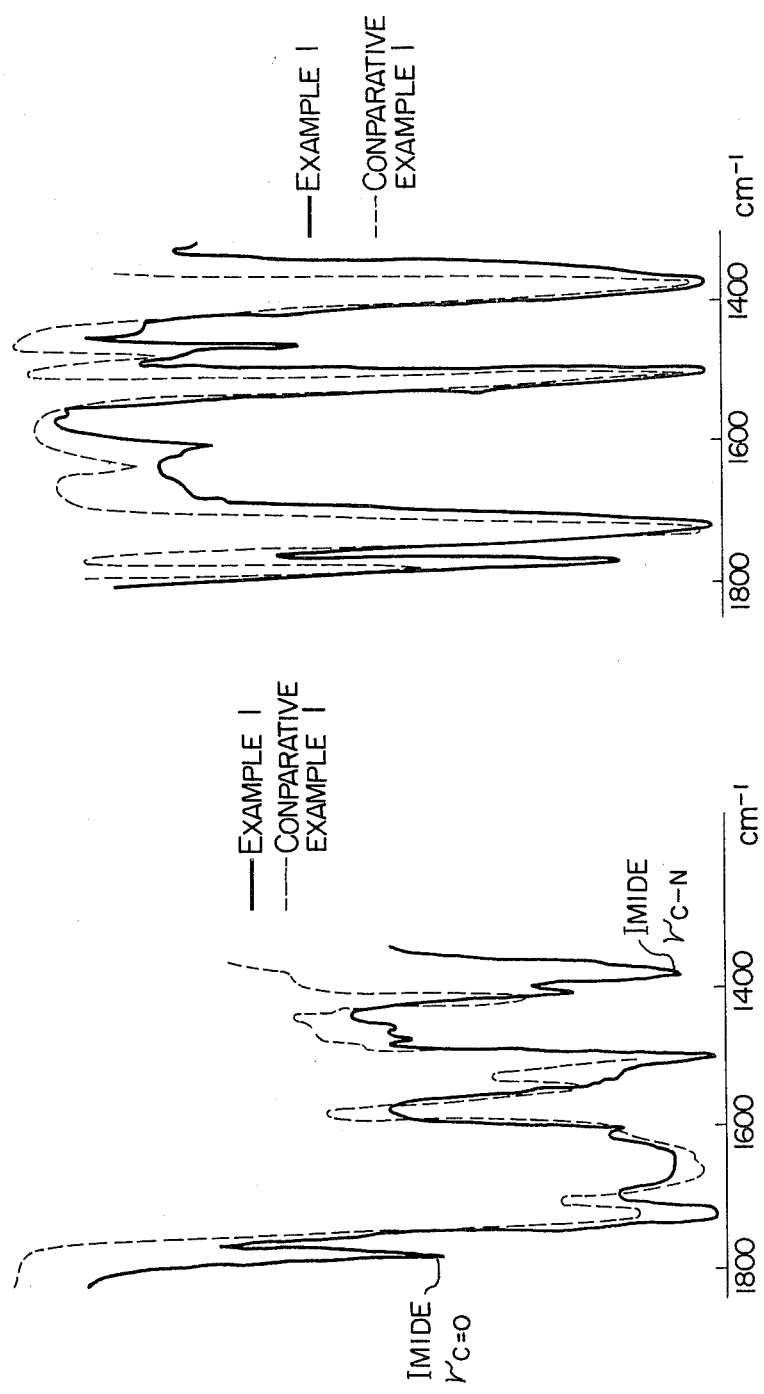
FIG. 1 shows infrared spectra of polyimide-amide-carboxylic acid (Example 1) and a conventional polyamide-carboxylic acid (Comparative Example 1) before dehydration and heat treatment for ring closure.

Then the reaction solution was coated on a glass plate in 10 mils thick and dried at 100° C. for 1 hour. After peeling off from the glass plate, the film was heat treated at 250° C. for 30 minutes to give an imide film. FIGS. 1 and 2 show infrared spectra of the product of this Comparative Example 1 corresponding to those of Example 1.

The film had the following properties:
Tensile strength (25° C.): 7.1 kg/mm$^2$
Elongation (25° C.): 12.3%
Pyrolysis initiation temperature: 429° C.

The reaction solutions obtained in Examples 1 and 2 and Comparative Example 1 were used as varnishes and relationship between heat treatment conditions and tensile strength and elongation, as well as storage stability were tested with the results as shown in Table 1.

As is clear from Table 1, the polyimide-amide-carboxylic acids produced by the process of this invention are improved in storage stability compared with a conventional polyamide-carboxylic acid and there are almost no lowering in various properties. Further, according to this invention, time required for dehydration and heat treatment for ring closure (imide formation) can be shortened considerably.

What is claimed is:

1. A process for producing a polyimide-amide-carboxylic acid which comprises
   (a) reacting an aromatic diamine with an aromatic tetracarboxylic acid dianhydride in amounts of 1.5 to 2.0 moles of the dianhydride per mole of the diamine in the presence of an inert solvent, and
   (b) reacting the resulting intermediate reaction product with an aromatic diisocyanate in about equivalent amounts at a temperature of 50° to 100° C. while removing generated carbon dioxide from the reaction system.

2. A process according to claim 1, wherein the reaction (a) is carried out at a temperature of 80° C. or lower.

3. A process according to claim 1, wherein the aromatic diamine is 4,4'-diaminodiphenyl ether, 4,4'-diaminodiphenylmethane, 4,4'-diaminodiphenyl sulfide, meta-phenylenediamine, para-phenylenediamine, 1,5-naphthalenediamine, 2,6-naphthalenediamine, 4,4'-diaminodiphenyl ether-3-sulfonamide, 4,4'-diaminodiphenyl ether-3-carbonamide, or a mixture thereof.

4. A process according to claim 3, wherein the aromatic tetracarboxylic acid dianhydride is pyromellitic acid dianhydride, 3,3',4,4'-diphenyltetracarboxylic acid dianhydride, 3,3',4,4'-benzophenonetetracarboxylic acid dianhydride, 1,2,5,6-naphthalenetetracarboxylic acid dianhydride, 2,3,5,6-naphthalenetetracarboxylic acid dianhydride, 2,3,5,6-pyridinetetracarboxylic acid dianhydride, 1,4,5,8-naphthalenetetracarboxylic acid dianhydride, or a mixture thereof.

5. A process according to claim 1, wherein the inert solvent is N-methyl-2-pyrrolidone, N,N-dimethylacetamide, N,N-dimethylformamide, N,N-diethylformamide, dimethylsulfoxide, hexamethylphosphoramide, tetramethylene sulfone, cresol, or a mixture thereof.

6. A process according to claim 4, wherein aromatic diisocyanate is 3,3'-diphenylether diisocyanate, 3,3'-diphenylmethane diisocyanate, 2,4-tolylene diisocyanate, 2,6-tolylene diisocyanate, or a mixture thereof.

7. A polyimide-amide-carboxylic acid produced by (a) reacting an aromatic diamine with an aromatic tetracarboxylic acid dianhydride in amounts of 1.5 to 2.0 moles of the dianhydride per mole of the diamine in the presence of an inert solvent, and (b) reacting the resulting intermediate reaction product with an aromatic diisocyanate in about equivalent amounts at a temperature of 50° to 100° C. while removing generated carbon dioxide from the reaction system.

TABLE 1

| Varnish | Items of properties | Heat treatment conditions | | | Storage stability (30° C.) | | |
| --- | --- | --- | --- | --- | --- | --- | --- |
| | | 250° C. 30 min. | 300° C. 30 min. | 300° C. 60 min. | Initial viscosity | 30 days | 60 days |
| Example 1 | Tensile strength (kg/mm$^2$) | 9.8 | 10.1 | 10.0 | 7.6 poises | 7.2 poises | 7.4 poises |
| | Elongation (%) | 10.9 | 10.8 | 10.8 | | | |
| Example 2 | Tensile strength (kg/mm$^2$) | 12.6 | 13.1 | 13.3 | 9.2 poises | 9.6 poises | 9.6 poises |
| | Elongation (%) | 12.1 | 11.6 | 11.8 | | | |
| Comparative Example 1 | Tensile strength (kg/mm$^2$) | 7.1 | 7.6 | 9.0 | 12.6 poises | 26.5 poises | 42.6 poises |
| | Elongation (%) | 12.3 | 11.7 | 10.1 | | | |

8. A polyimide-amide-carboxylic acid according to claim 7, wherein the aromatic diamine is 4,4'-diaminodiphenyl ether, 4,4'-diaminodiphenylmethane, 4,4'-diaminodiphenyl sulfide, meta-phenylenediamine, para-phenylenediamine, 1,5-naphthalenediamine, 2,6-naphthalenediamine, 4,4'-diaminodiphenyl ether-3-sulfonamide, 4,4'-diaminodiphenyl ether-3-carbonamide, or a mixture thereof.

9. A polyimide-amide-carboxylic acid according to claim 8, wherein the aromatic tetracarboxylic acid dianhydride is pyromellitic acid dianhydride, 3,3',4,4'-diphenyltetracarboxylic acid dianhydride, 3,3',4,4'-benzophenonetetracarboxylic acid dianhydride, 1,2,5,6-naphthalenetetracarboxylic acid dianhydride, 2,3,5,6-naphthalenetetracarboxylic acid dianhydride, 2,3,5,6-pyridinetetracarboxylic acid dianhydride, 1,4,5,8-naphthalenetetracarboxylic acid dianhydride, or a mixture thereof.

10. A polyimide-amide-carboxylic acid according to claim 9, wherein the aromatic diisocyanate is 3,3'-diphenylether diisocyanate, 3,3'-diphenylmethane diisocyanate, 2,4-tolylene diisocyanate, 2,6-tolylene diisocyanate or a mixture thereof.

* * * * *